(12) United States Patent
Liu (10) Patent No.: US 11,963,043 B2
(45) Date of Patent: Apr. 16, 2024

(54) INITIAL ACCESS INDICATION METHOD AND DEVICE, AND STORAGE MEDIUM

(71) Applicant: Beijing Xiaomi Mobile Software Co., Ltd., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 148 days.

(21) Appl. No.: 17/597,139

(22) PCT Filed: Jun. 28, 2019

(86) PCT No.: PCT/CN2019/093915
§ 371 (c)(1),
(2) Date: Dec. 27, 2021

(87) PCT Pub. No.: WO2020/258329
PCT Pub. Date: Dec. 30, 2020

(65) Prior Publication Data
US 2022/0272581 A1  Aug. 25, 2022

(51) Int. Cl.
*H04W 28/20* (2009.01)
*H04W 48/10* (2009.01)
*H04W 56/00* (2009.01)

(52) U.S. Cl.
CPC .......... *H04W 28/20* (2013.01); *H04W 48/10* (2013.01); *H04W 56/0005* (2013.01); *H04W 56/0035* (2013.01)

(58) Field of Classification Search
CPC . H04W 28/20; H04W 48/10; H04W 56/0005; H04W 56/0035
See application file for complete search history.

(56) References Cited

U.S. PATENT DOCUMENTS

2019/0110314 A1\* 4/2019 Abedini ................ H04W 72/53
2020/0204237 A1\* 6/2020 Zhou .................... H04B 7/0408
2022/0166468 A1\* 5/2022 Go ....................... H04B 7/0456

FOREIGN PATENT DOCUMENTS

| CN | 108064466 A | 5/2018 |
|---|---|---|
| WO | 2016119261 A1 | 8/2016 |
| WO | 2019064236 A3 | 4/2019 |

OTHER PUBLICATIONS

Go et al., U.S. Appl. No. 62/831,174, filed Apr. 8, 2019, p. 6, 23, 28, 29, 60.\*
"Reselection to a cell with initial BWP that has BW not supported by UE," Proceedings of the 3GPP TSG-RAN WG2 Meeting #103, R2-1811301, Aug. 20, 2018, Gothenburg, Sweden, 2 pages.
"Channel Bandwidth Signalling," Proceedings of the 3GPP TSG-RAN WG2 Meeting #103bis, R2-1814227, Oct. 8, 2018, Chengdu, China, 9 pages.

\* cited by examiner

*Primary Examiner* — Jackie Zuniga Abad
(74) *Attorney, Agent, or Firm* — McCoy Russell LLP (57) ABSTRACT

An initial access indication method includes: carrying flag information in a Synchronization Signal Block (SSB), the flag information indicating whether an initial access bandwidth corresponding to the SSB supports the access of a first type user equipment (UE).

15 Claims, 6 Drawing Sheets

Initial access indication apparatus 100

Transmission module 110

FIG. 5

Transmission module 110

First transmission submodule 111

FIG. 6

Initial access indication apparatus 100

Configuration module 120

INITIAL ACCESS INDICATION METHOD AND DEVICE, AND STORAGE MEDIUM

CROSS REFERENCE TO RELATED APPLICATIONS

The present application is a U.S. National Phase of International Application No. PCT/CN2019/093915 entitled "INITIAL ACCESS INDICATION METHOD AND DEVICE, AND STORAGE MEDIUM," and filed on Jun. 28, 2019. The entire contents of the above-listed application are hereby incorporated by reference for all purposes.

BACKGROUND AND SUMMARY

Currently, R15 (Release 15) and R16 (Release 16) versions of 5th Generation (5G) mobile communication networks cannot well support the access of narrow-band User Equipment (UE).

The narrow-band UE usually refers to some low-cost UE, such as watches that support narrow bands, and home interconnection devices. In 5G mobile communication network systems, the narrow band may be defined as having a bandwidth of less than 10 MHz in low frequency bands and less than 140 MHz in high frequency bands. The narrowband UE cannot access the R15 and R16 versions of 5G mobile communication networks.

According to a first aspect of the examples of the present disclosure, an initial access indication method is provided, wherein the method includes:
  carrying flag information in a Synchronization Signal Block (SSB), the flag information indicates whether an initial access bandwidth corresponding to the SSB supports the access of a first type of user equipment (UE).

According to a second aspect of the examples of the present disclosure, an initial access indication method, the method including:
  acquiring flag information carried in a SSB, the flag information indicates whether an initial access bandwidth corresponding to the SSB supports the access of a first type of UE; and
  determining, according to the flag information, whether to use configuration information included in the SSB to access a network.

According to a third aspect of the examples of the present disclosure, an initial access instruction apparatus is provided, including: a transceiver, a memory, a processor, and a computer program stored on the memory and executed by the processor;

The processor is connected with the transceiver and the memory respectively, and is configured to implement the method provided in the first aspect or the second aspect by executing the computer program.

According to a fourth aspect of the examples of the present disclosure, a non-transitory computer storage medium is provided, the computer storage medium stores a computer program, and the computer program is executed to implement the method provided in the first aspect or the second aspect.

It should be understood that the above general description and the following detailed description are only exemplary and explanatory, and cannot limit the examples of the present disclosure.

BRIEF DESCRIPTION OF THE FIGURES

The accompanying drawings herein are incorporated into the specification and constitute a part of the specification, show examples consistent with the present invention, and are used to explain the principle of the examples of the present invention together with the specification.

DETAILED DESCRIPTION

Examples will be described in detail here, and examples are shown in the accompanying drawings. When the following descriptions refer to the drawings, the same numbers in different drawings indicate the same or similar elements, unless otherwise indicated. The implementation manners described in the following examples do not represent all implementation manners consistent with the examples of the present invention. Instead, they are merely examples of apparatuses and methods consistent with some aspects of the examples of the present invention.

The terms used in the examples of the present disclosure are only for the purpose of describing specific examples, and are not intended to limit the examples of the present disclosure. The singular forms of "a", "the" and "this" used in the examples of the present disclosure are also intended to include plural forms, unless the context clearly expresses other meanings. It should also be understood that the term "and/or" used herein refers to and includes any or all possible combinations of one or more associated listed items.

It should be understood that the terms first, second, third, etc. may be used in the examples of the present disclosure to describe a variety of information, but the information should not be limited to these terms. These terms are only used to distinguish the same type of information from each other. For example, without departing from the scope of the examples of the present disclosure, the first information may also be referred to as second information, and similarly, the second information may also be referred to as first information. Depending on the context, the term "if" used herein may be interpreted as "when" or "while" or "in response to determining".

Figure 1:
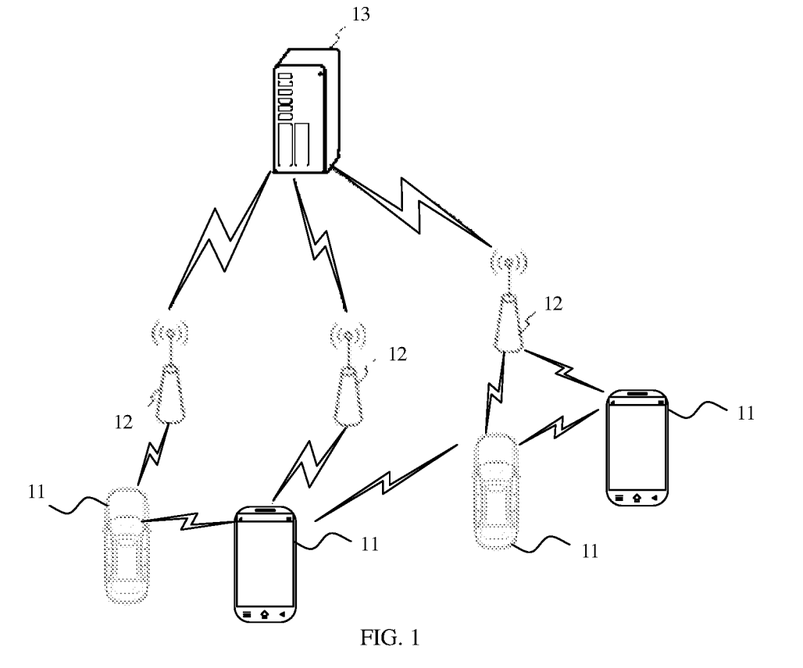
FIG. 1 is a schematic structural diagram of a wireless communication system according to an example.

Referring to FIG. 1, a schematic structural diagram of a wireless communication system according to an example of the present disclosure is shown. As shown in FIG. 1, the wireless communication system is a communication system based on cellular mobile communication technology. The wireless communication system may include a number of terminals 11 and a number of base stations 12.

The terminal 11 may be a device that provides voice and/or data connectivity to a user. The terminal 11 may communicate with one or more core networks via a Radio Access Network (RAN). The terminal 11 may be an Internet of Things terminal, such as a sensor device, a mobile phone (or "cellular" phone), and a computer with an Internet of Things terminal, for example, it may be a fixed, portable, pocket-sized, hand-held, computer built-in or vehicle-mounted apparatus. For example, the terminal 110 is a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may also be a device of an unmanned aerial vehicle. Alternatively, the terminal 11 may also be a vehicle-mounted device, for example, it may be a trip computer with a wireless communication function, or a wireless communication device connected to a trip computer. Alternatively, the terminal 11 may also be a roadside device, for example, it may be a street lamp, a signal lamp, or other roadside device with a wireless communication function.

The base station 12 may be a network side device in a wireless communication system. The wireless communication system may be a 5G system, also known as a new radio (NR) system or a 5G NR system. Alternatively, the wireless communication system may also be a next-generation system of the 5G system. The access network in the 5G system may be called NG-RAN (New Generation-Radio Access Network).

The base station 12 may be a base station (gNB) adopting a central distributed architecture in the 5G system. When the base station 12 adopts a central distributed architecture, it usually includes a central unit (CU) and at least two distributed units (DUs). The central unit is provided with protocol stacks of a Packet Data Convergence Protocol (PDCP) layer, a Radio Link Control (RLC) layer, and a Media Access Control (MAC) layer; and the distributed unit is provided with a Physical (PHY) layer protocol stack. The example of the disclosure does not limit the specific implementation of the base station 12.

A wireless connection may be established between the base station 12 and the terminal 11 through a wireless air interface. In different examples, the wireless air interface is a wireless air interface based on the fifth-generation mobile communication network technology (5G) standards, for example, the wireless air interface is new radio; or, the wireless air interface may also be a wireless air interface based on 5G-based next-generation mobile communication network technology standards.

In some examples, an E2E (End to End) connection may also be established between the terminals 11. In some examples, the above-mentioned wireless communication system may further include a network management device 13.

The base stations 12 are connected to the network management device 13 respectively. The network management device 13 may be a core network device in the wireless communication system. For example, the network management device 13 may be a Mobility Management Entity (MME) in an Evolved Packet Core (EPC). Alternatively, the network management device may also be other core network devices, such as a Serving GateWay (SGW), a Public Data Network GateWay (PGW), a Policy and Charging Rules Function (PCRF) unit, or a Home Subscriber Server (HSS). The implementation form of the network management device 13 is not limited in the examples of the present disclosure.

The execution subjects involved in the examples of the present disclosure include, but are not limited to: terminals, base stations, etc.

In an application scenario of the examples of the present disclosure, when a narrow-band UE accesses a 5G network, it cannot support the transmission bandwidth of resource configuration information of a control resource collection (CORESET #0), and will perform invalid search attempts on the CORESET #0 during access, thus reducing the performance of initial search.

Figure 2:
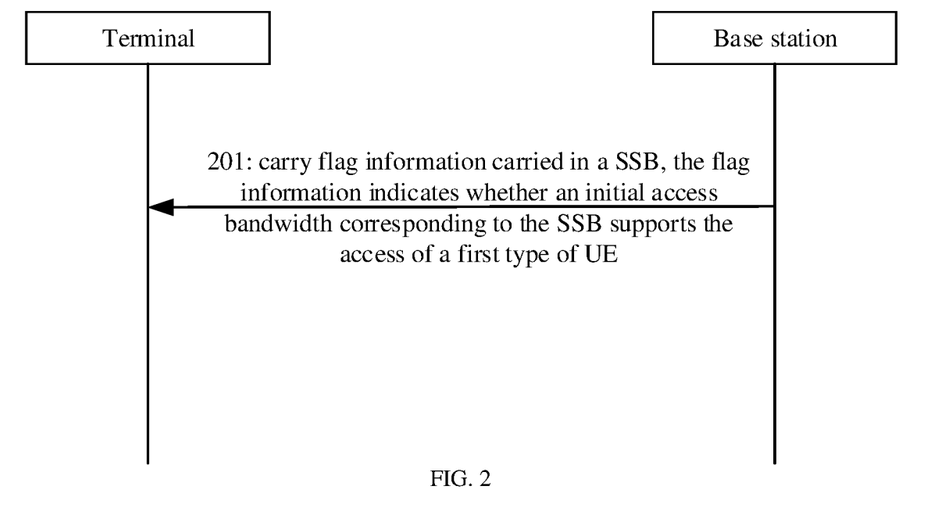
FIG. 2 is a schematic flowchart of an initial access indication method according to an example.

As shown in FIG. 2, this example provides an initial access indication method. The initial access indication method may be used in a base station, and includes:

Step 201: flag information is carried in a SSB, the flag information indicates whether an initial access bandwidth corresponding to the SSB supports the access of a first type of UE.

Here, the first type of UE may refer to a narrow-band UE, and the bandwidth supported by the narrow-band UE is relatively fixed. In 5G mobile communication network systems, the narrow band may be defined as having a bandwidth of less than 10 MHz in low frequency bands of 7 GHz or less and less than 140 MHz in high frequency bands of 28 GHz or more. The bandwidth supported by the narrow-band UE is usually less than initial access bandwidths of R15 and R16 versions of 5G mobile communication networks. Thus, the narrow-band UE cannot access the R15 and R16 versions of 5G mobile communication networks.

In the 5G mobile communication network, the content included in the SSB occupies a plurality of consecutive symbols. The symbols include: some for transmitting Primary Synchronization Signals (PSS), some for transmitting Secondary Synchronization Signals (SSS), and some for transmitting Physical Broadcast Channel (PBCH) information. During initial access, the UE acquires the PSS and SSS information sequentially, demodulates the information on the PBCH, and accesses the 5G network according to the decoded information.

The transmission bandwidth of the SSB is smaller than that of the first type of UE. Thus, the first type of UE can receive and demodulate the SSB normally. However, in the R15 and R16 versions of 5G mobile communication networks, the transmission bandwidth of the resource configuration information of the control resource collection CORESET #0 subsequent to the SSB is generally large, and the first type of UE cannot receive such information. The first type of UE will continue to search the control resource collection repeatedly until the exit condition is satisfied and start to try another SSB. In this way, resources are consumed during the search, and delays are generated.

By setting the flag information in the SSB, after the UE decodes the SSB, it can be determined whether the initial access bandwidth corresponding to the configuration information of the current SSB supports the first type of UE, and if the initial access bandwidth does not support the first type of UE, the UE no longer uses the configuration information of the current SSB to access the network but continues to search for other SSB to access the network, which can reduce continuous invalid search attempts because the UE cannot determine whether it can access the network using the configuration information included in the SSB after receiving the SSB, thus improving the network access efficiency of the UE and reducing access delays.

Here, the flag information may be indicated by two values of a bit, such as "0" and "1", respectively indicating that the initial access bandwidth corresponding to the SSB supports and does not support the access of the first type of UE.

In an example, carrying flag information in a SSB includes: the flag information is carried in $\bar{a}(A+7)$ bit of a physical broadcast channel (PBCH) message.

Here, the flag information may be carried in the PBCH message of the 5G mobile communication network. The $\bar{a}(A+7)$ bit is an address carrying information in the PBCH message, and the $\bar{a}(A+7)$ bit represents the 7th bit of a Payload in the PBCH. There are 8 bits of coded information outside a Master Information Block (MIB) of the PBCH, and the flag information may be set in the 7th bit.

Because the indication is performed by the spare bit in the R15 or R16 version of 5G signal, the UE with the R15 or R16 version of bandwidth is not affected by the flag information, and will not interpret the spare bit when receiving the SSB message, and the flag information is meaningless for the UE with the R15 or R16 version of bandwidth. According to the access process of the R15 or R16 version of UE, the $\bar{a}(A+7)$ bit in the PBCH message is a spare bit, so the R15 or R16 version of UE will not respond to the flag information carried in the $\bar{a}(A+7)$ bit of the PBCH message. No matter the flag information indicates whether the initial access bandwidth supports the access of the first type of UE, the UE with the R15 or R16 version of bandwidth will try to access the network according to its own access process. That is, no matter how large the transmission bandwidth of the resource configuration information of the control resource collection is, the UE with the R15 or R16 version of bandwidth will search and decode.

After the narrow-band UE is supported, R15 or R16 subsequent versions of 5G UEs, such as R17 version of 5G UEs, are supported to access, or the access is stopped and other SSBs are searched. After the large-bandwidth UE accesses, the base station may configure the Bandwidth Part (BWP) of the large-bandwidth UE through Radio Resource Control (RRC) signaling.

Carrying the flag information in the $\bar{a}(A+7)$ bit of the PBCH message can improve compatibility without affecting UEs with the R15 or R16 version of bandwidth, and can also provide flag information for subsequent versions of 5G UEs.

In an example, the initial access bandwidth includes: a transmission bandwidth of resource configuration information of a control resource collection corresponding to the SSB.

Here, the initial access bandwidth refers to a transmission bandwidth of resource configuration information of a control resource collection corresponding to the SSB. When the UE accesses the network, the UE first receives the SSB. Since the bandwidth of the SSB is usually small, the first type of UE can receive the SSB. After demodulating the SSB, the UE starts to search for the control resource collection, but the transmission bandwidth of the resource configuration information of the control resource collection is relatively large, which is not supported by the first type of UE; thus, the transmission bandwidth of the resource configuration information of the control resource collection limits whether the first type of UE can search the control resource collection.

In an example, the method further includes: the control resource collection corresponding to the SSB is configured; the transmission bandwidth of the resource configuration information of the control resource collection is determined according to the number of resources included in the control resource collection.

In a NR system, resource configuration information such as frequency bands occupied in the frequency domain of a PDCCH and the number of OFDM symbols occupied in the time domain of the PDCCH are collected together to form the control resource collection. The more resources of the control resource collection are, the more resource configuration information used to configure the resources is; the more resource configuration information of the control resource collection is, the larger the bandwidth occupied for transmitting the resource configuration information of the control resource collection is. The base station may determine the transmission bandwidth of the resource configuration information of the control resource collection according to the corresponding relationship between the resource configuration information of the control resource collection and the transmission bandwidth in 5G standards. The resource configuration information of the control resource collection may include: time-frequency resource information of the control resource collection, a PDCCH aggregation level collection that requires blind test in the control resource collection, Downlink Control Information (DCI) parameters of the PDCCH that require blind test in CORE-SET, etc.

CORESET #0 may take 6 Physical Resource Blocks (PRBs) as the basic unit. At present, 24 PRBs form a CORESET #0. In order to make the resource configuration information of the control resource collection smaller, 18 PRB resources may be configured in CORESET #0 in a possible implementation manner. There is a little of resource configuration information in the CORESET #0 composed of 18 PRBs, which occupies a small bandwidth during transmission.

In an example, the flag information indicating whether an initial access bandwidth corresponding to the SSB supports the access of a first type of UE includes: when the transmission bandwidth of the resource configuration information of the control resource collection is not greater than the bandwidth of the SSB, the flag information indicating that the initial access bandwidth corresponding to the SSB supports the access of the first type of UE.

When the transmission bandwidth of the resource configuration information of the control resource collection is not greater than the transmission bandwidth of the SSB, it can be determined that the transmission bandwidth of the resource configuration information of the control resource collection is not greater than the bandwidth that the first type of UE can support. Thus, the flag information can be set to indicate that the initial access bandwidth corresponding to the SSB supports the access of the first type of UE. The first type of UE can read the resource configuration information of the control resource collection, and then access the network.

Taking the access of the first type of UE to the network as an example, when the first type of UE acquires a SSB and determines that the flag information indicates that the initial access bandwidth corresponding to the SSB supports the access of the first type of UE, the UE continues to read the resource configuration information of the control resource collection to acquire PDCCH #0 configuration information, and then access the network.

In view of the situation that the R15 and R16 versions of 5G control resource collection include a large number of resources, a control resource collection with a smaller number of resources can be additionally configured. In this way, the resource configuration information of the control resource collection can be reduced, and the bandwidth required to transmit the resource configuration information of the control resource collection can be not greater than the transmission bandwidth of the SSB.

In an example, the flag information indicating whether an initial access bandwidth corresponding to the SSB supports the access of a first type of UE includes: when the transmission bandwidth of the resource configuration information of the control resource collection is greater than the bandwidth of the SSB, the flag information indicating that the initial access bandwidth corresponding to the SSB supports the access of a second type of UE, wherein the bandwidth supported by the second type of UE is greater than that supported by the first type of UE.

Here, the second type of UE can support R15, R16 and subsequent versions such as R17 of 5G bandwidths. Thus, even if the transmission bandwidth of the resource configuration information of the control resource collection is greater than the transmission bandwidth of the SSB, the second type of UE can still receive the resource configuration information of the control resource collection.

When the transmission bandwidth of the resource configuration information of the control resource collection is greater than the transmission bandwidth of the SSB, it can be determined that the transmission bandwidth of the control resource collection may be greater than the bandwidth that the first type of UE can support. In this case, the first type of UE may not be able to receive the control resource collection, and the flag information may be set to indicate that the initial access bandwidth corresponding to the SSB supports the access of the second type of UE.

Taking the access of the first type of UE to the network as an example, if the first type of UE determines that the flag information indicates that the initial access bandwidth corresponding to the SSB supports the access of the second type of UE, the first type of UE abandons using the configuration information of the current SSB to access the current network, but searches for another SSB for access, thus reducing continuous invalid search attempts due to the indeterminacy about whether the initial access bandwidth corresponding to the current SSB is supported. Here, the invalid search attempts may be invalid search attempts on the control resource collection.

Figure 3:
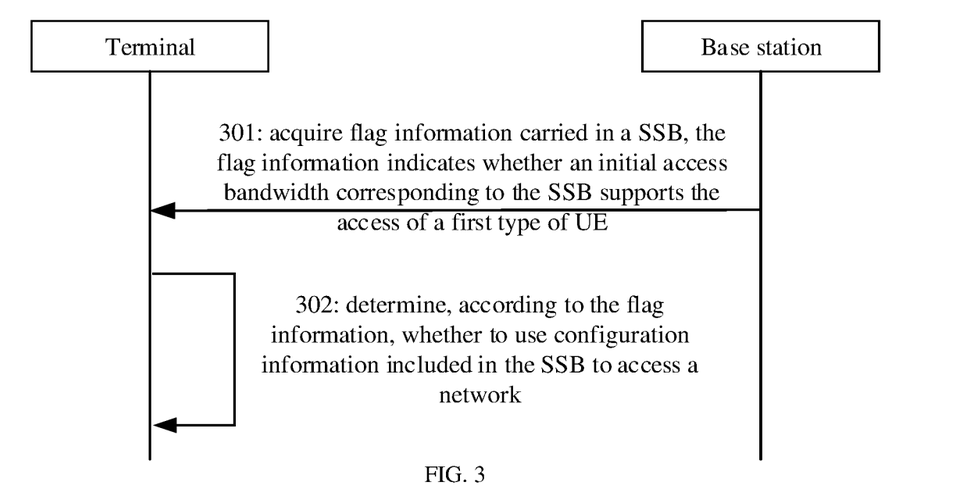
FIG. 3 is a schematic flowchart of another initial access indication method according to an example.

As shown in FIG. 3, this example provides an initial access indication method. The initial access indication method may be used in a terminal, and includes:

Step 301: flag information carried in a SSB is acquired, the flag information indicates whether an initial access bandwidth corresponding to the SSB supports the access of a first type of UE;

Step 302: whether to use configuration information included in the SSB to access a network is determined according to the flag information.

Here, a UE such as a mobile phone terminal may receive the SSB, determine the flag information, and determine whether to use the configuration information included in the SSB to access the network. The type of UE may be a first type of UE.

Here, the first type of UE may refer to a narrow-band UE, and the bandwidth supported by the narrow-band UE is relatively fixed. In 5G mobile communication network systems, the narrow band may be defined as having a bandwidth of less than 10 MHz in low frequency bands of 7 GHz or less and less than 140 MHz in high frequency bands of 28 GHz or more. The bandwidth supported by the narrow-band UE is usually less than initial access bandwidths of R15 and R16 versions of 5G mobile communication networks. Thus, the narrow-band UE cannot access the R15 and R16 versions of 5G mobile communication networks.

The content included in each SSB occupies a plurality of consecutive symbols. The symbols include: some for transmitting PSS, some for transmitting SSS, and some for transmitting PBCH information. During initial access, the UE acquires the PSS and SSS information sequentially, demodulates the information on the PBCH, and then accesses the 5G network according to the decoded information.

The transmission bandwidth of the SSB is smaller than that of the first type of UE. Thus, the first type of UE can receive and demodulate the SSB normally. However, in the R15 and R16 versions of 5G mobile communication networks, the transmission bandwidth of the resource configuration information of the control resource collection CORE-SET #0 subsequent to the SSB is generally large, and the first type of UE cannot receive such information. The first type of UE will continue to search the control resource collection repeatedly until the exit condition is satisfied and start to try another SSB. In this way, resources are consumed during the search, and delays are generated.

By setting the flag information in the SSB, after the UE decodes the SSB, it can be determined whether the initial access bandwidth corresponding to the configuration information of the current SSB supports the first type of UE, and if the initial access bandwidth does not support the first type of UE, the UE no longer uses the configuration information of the current SSB to access the network but continues to search for other SSB to access the network, which can reduce continuous invalid search attempts because the UE cannot determine whether it can access the network using the configuration information included in the SSB after receiving the SSB, thus improving the network access efficiency of the UE and reducing access delays.

Here, the flag information may be indicated by two values of a bit, such as "0" and "1", respectively indicating that the initial access bandwidth corresponding to the SSB supports and does not support the access of the first type of UE.

The UE can determine whether to access according to its own situation. If the UE receiving the SSB is the first type of UE, it can access the network; if the UE is a UE supporting large bandwidths of R15 or R16 subsequent versions of 5G mobile communication networks, it can determine to access the network or abandon the access by combining its own requirements for network access.

In an example, the initial access bandwidth includes:
  a transmission bandwidth of resource configuration information of a control resource collection corresponding to the SSB.

Here, the initial access bandwidth refers to a transmission bandwidth of resource configuration information of a control resource collection corresponding to the SSB. When the UE accesses the network, the UE first receives the SSB. Since the bandwidth of the SSB is usually small, the first type of UE can receive the SSB. After demodulating the SSB, the UE starts to search for the control resource collection, but the transmission bandwidth of the resource configuration information of the control resource collection is relatively large, which is not supported by the first type of UE; thus, the transmission bandwidth of the resource configuration information of the control resource collection limits whether the first type of UE can search the control resource collection.

In a NR system, resource configuration information such as frequency bands occupied in the frequency domain of a PDCCH and the number of OFDM symbols occupied in the time domain of the PDCCH are collected together to form the control resource collection. The more resources of the control resource collection are, the more resource configuration information used to configure the resources is; the more resource configuration information of the control resource collection is, the larger the bandwidth occupied for transmitting the resource configuration information of the control resource collection is. The base station may determine the transmission bandwidth of the resource configuration information of the control resource collection according to the corresponding relationship between the resource configuration information of the control resource collection and the transmission bandwidth in 5G standards. The resource configuration information of the control resource collection may include: time-frequency resource information of the control resource collection, a PDCCH aggregation level collection that requires blind test in the control resource collection, DCI parameters of the PDCCH that require blind test in CORESET, etc.

CORESET #0 can take 6 PRBs as the basic unit. For example, 24 PRBs form a CORESET #0. In order to make the resource configuration information of the control resource collection smaller, 18 PRB resources may be configured in CORESET #0 in a possible implementation manner. There is a little of resource configuration information in the CORESET #0 composed of 18 PRBs, which occupies a small bandwidth during transmission.

In an example, acquiring a flag information carried in a SSB includes: acquiring the flag information carried in a ā(A+7) bit of a PBCH message.

Here, the flag information may be carried in the PBCH message of the 5G mobile communication network. The ā(A+7) bit is an address carrying information in the PBCH message, and the ā(A+7) bit represents the 7th bit of a Payload in the PBCH. There are 8 bits of coded information outside a Master Information Block (MIB) of the PBCH, and the flag information may be set in the 7th bit.

Because the indication is performed by the spare bit in the R15 or R16 version of 5G signal, the UE with the R15 or R16 version of bandwidth is not affected by the flag information, and will not interpret the spare bit when receiving the SSB message, and the flag information is meaningless for the UE with the R15 or R16 version of bandwidth. According to the access process of the R15 or R16 version of UE, the ā(A+7) bit in the PBCH message is a spare bit, so the R15 or R16 version of UE will not respond to the flag information carried in the ā(A+7) bit of the PBCH message. No matter the flag information indicates whether the initial access bandwidth supports the access of the first type of UE, the UE with the R15 or R16 version of bandwidth will try to access the network according to its own access process. That is, no matter how large the transmission bandwidth of the resource configuration information of the control resource collection is, the UE with the R15 or R16 version of bandwidth will search and decode. After the narrow-band UE is supported, R15 or R16 subsequent versions of 5G UEs, such as R17 version of 5G UEs, are supported to access, or the access is stopped and other SSBs are searched. After the large-bandwidth UE accesses, the base station may configure the Bandwidth Part (BWP) of the large-bandwidth UE through Radio Resource Control (RRC) signaling.

Carrying the flag information in the ā(A+7) bit of the PBCH message can improve compatibility without affecting UEs with the R15 or R16 version of bandwidth, and can also provide flag information for subsequent versions of 5G UEs.

In an example, determining, according to the flag information, whether to use configuration information included in the SSB to access a network includes:

When the flag information indicates that the initial access bandwidth corresponding to the SSB supports the access of the first type of UE, the configuration information included in the SSB is used to access the network;

When the flag information indicates that the initial access bandwidth corresponding to the SSB does not support the access of the first type of UE, the configuration information included in the SSB is not used to access the network.

When the transmission bandwidth of the resource configuration information of the control resource collection is not greater than the transmission bandwidth of the SSB, it can be determined that the transmission bandwidth of the resource configuration information of the control resource collection is not greater than the bandwidth that the first type of UE can support. Thus, the flag information can be set to indicate that the initial access bandwidth corresponding to the SSB supports the access of the first type of UE.

Taking the access of the first type of UE to the network as an example, when the first type of UE acquires a SSB and determines that the flag information indicates that the initial access bandwidth corresponding to the SSB supports the access of the first type of UE, the UE continues to read the resource configuration information of the control resource collection to acquire PDCCH #0 configuration information, and then access the network.

If it is determined that the flag information indicates that the initial access bandwidth corresponding to the SSB does not support the access of the first type of UE, using the configuration information included in the SSB to access the network is abandoned, but another SSB is searched for access, thus reducing continuous invalid search attempts due to the indeterminacy about whether the initial access bandwidth corresponding to the current SSB is supported. Here, the invalid search attempts may be invalid search attempts on the control resource collection.

In view of the situation that the R15 and R16 versions of 5G control resource collection include a large number of resources, a control resource collection with a smaller number of resources can be additionally configured. In this way, the resource configuration information of the control resource collection can be reduced, and the bandwidth required to transmit the resource configuration information of the control resource collection can be not greater than the transmission bandwidth of the SSB.

Figure 4:
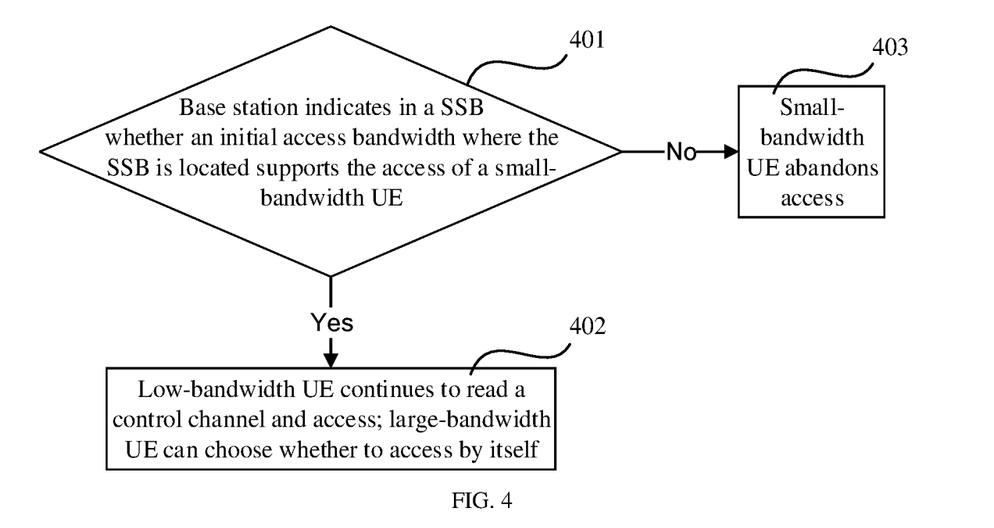
FIG. 4 is a schematic flowchart of yet another initial access indication method according to an example.

A specific example is provided below in conjunction with any of the foregoing examples:

As shown in FIG. 4, the specific steps of the method in this example include:

Step 401: a base station indicates in a SSB whether an initial access bandwidth where the SSB is located supports the access of a small-bandwidth UE;

The specific indication in the SSB may use a spare bit in the MIB, to indicate whether the bandwidth of CORESET0 related to the SSB is suitable for the small-bandwidth UE.

The specific indication in the SSB uses a 7th bit of a Payload in a PBCH to carry flag information for indication.

Since the indication is performed by the spare bit in the R15 or R16 version of 5G signal, the UE with the R15 or R16 version of bandwidth is not affected by the indication, and the indication bit is considered meaningless.

The UE with the R17 version of bandwidth can choose to access or stop accessing and search for other SSBs Step 402: if supporting, the low-bandwidth UE continues to read a control channel and access; a large-bandwidth UE can choose whether to access by itself, and is configured by the base station to migrate after access.

Here, after the large-bandwidth UE accesses, the base station configures the Bandwidth Part (BWP) of the large-bandwidth UE through Radio Resource Control (RRC) signaling.

Step 403: if not supporting, the low-bandwidth UE abandons access and continues to search for a suitable initial access bandwidth of the SSB.

Figure 5:
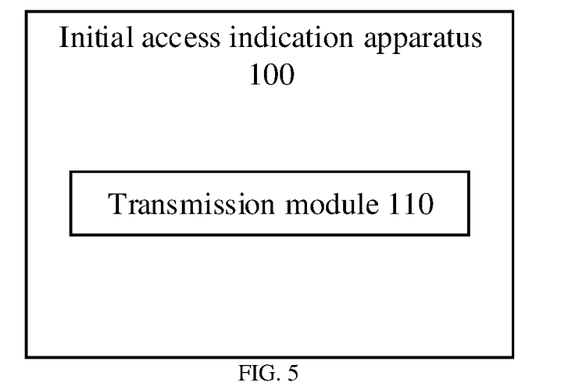
FIG. 5 is a block diagram of an initial access indication apparatus according to an example.

An example of the present invention further provides an initial access apparatus, which is applied to a base station. FIG. 5 is a schematic structural diagram of an initial access indication apparatus 100 according to an example of the present invention. As shown in FIG. 5, the apparatus 100 includes:

a transmission module 110, configured to carry flag information in a SSB, the flag information indicates whether an initial access bandwidth corresponding to the SSB supports the access of a first type of UE.

Figure 6:
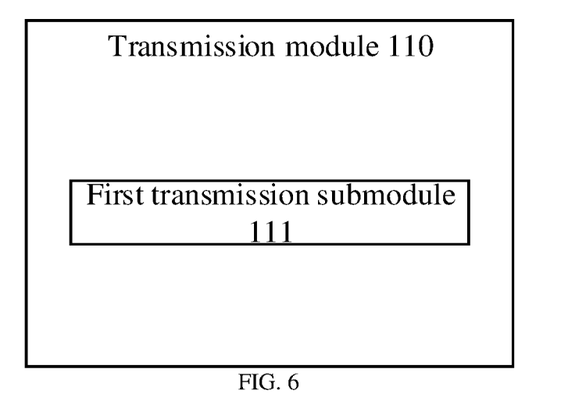
FIG. 6 is a block diagram of another initial access indication apparatus according to an example.

In an example, as shown in FIG. 6, the transmission module 110 includes:

a first transmission submodule, configured to carry the flag information in a $\bar{a}(A+7)$ bit of a PBCH message.

In an example, the initial access bandwidth includes:
a transmission bandwidth of resource configuration information of a control resource collection corresponding to the SSB.

Figure 7:
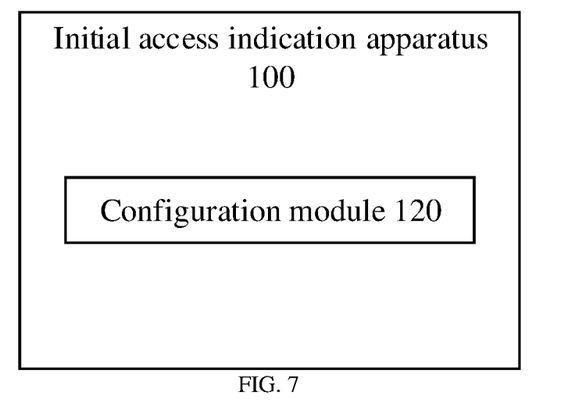
FIG. 7 is a block diagram of yet another initial access indication apparatus according to an example.

In an example, as shown in FIG. 7, the apparatus 100 further includes:

a configuration module 120, configured to configure the control resource collection corresponding to the SSB;

The transmission bandwidth of the resource configuration information of the control resource collection is determined according to the number of resources included in the control resource collection.

Figure 8:
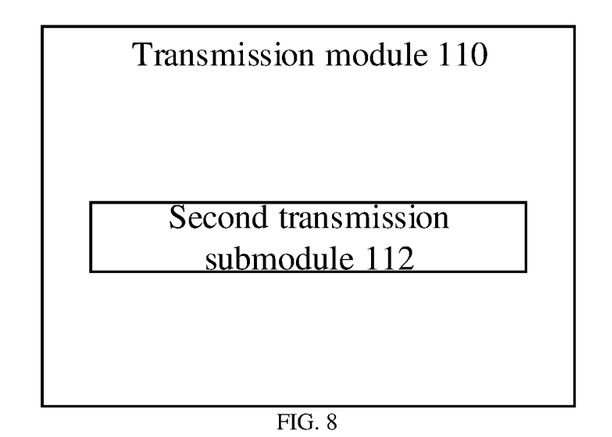
FIG. 8 is a block diagram of still another initial access indication apparatus according to an example.

In an example, as shown in FIG. 8, the transmission module 110 includes:

a second transmission submodule 112, configured for, when the transmission bandwidth of the resource configuration information of the control resource collection is not greater than the bandwidth of the SSB, the flag information indicating that the initial access bandwidth corresponding to the SSB supports the access of the first type of UE.

Figure 9:
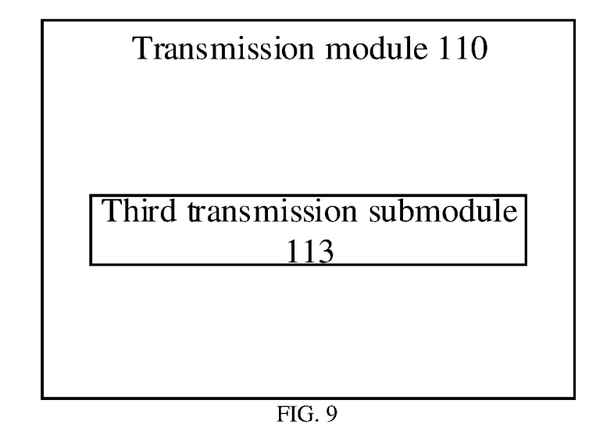
FIG. 9 is a block diagram of still another initial access indication apparatus according to an example.

In an example, as shown in FIG. 9, the transmission module 110 includes:

a third transmission submodule 113, configured for, when the transmission bandwidth of the resource configuration information of the control resource collection is greater than the bandwidth of the SSB, the flag information indicating that the initial access bandwidth corresponding to the SSB supports the access of a second type of UE, wherein the bandwidth supported by the second type of UE is greater than that supported by the first type of UE.

Figure 10:
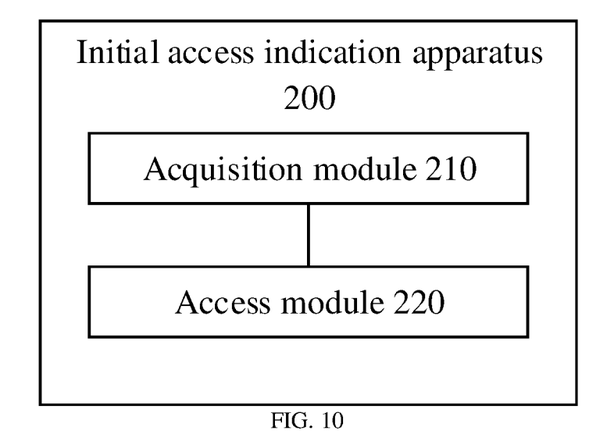
FIG. 10 is a block diagram of an initial access indication apparatus according to an example.

An example of the present invention further provides an initial access indication apparatus, which is applied to a terminal. FIG. 10 is a schematic structural diagram of an initial access indication apparatus 200 according to an example of the present invention. As shown in FIG. 10, the apparatus 200 includes:

an acquisition module 210, configured to acquire flag information carried in a SSB, the flag information indicates whether an initial access bandwidth corresponding to the SSB supports the access of a first type of UE; and an access module 220, configured to determine, according to the flag information, whether to use configuration information included in the SSB to access a network.

In an example, the initial access bandwidth includes:
a transmission bandwidth of resource configuration information of a control resource collection corresponding to the SSB.

Figure 11:
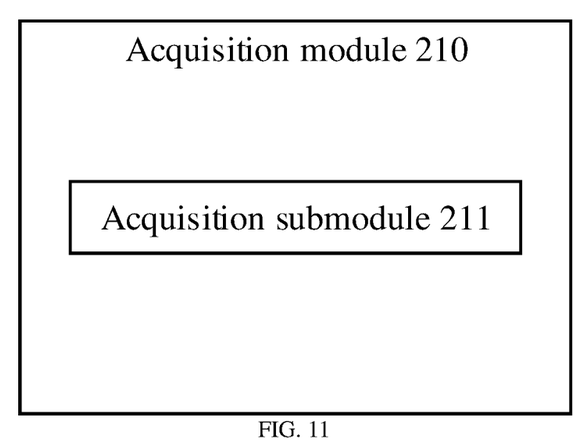
FIG. 11 is a block diagram of another initial access indication apparatus according to an example.

In an example, as shown in FIG. 11, the acquisition module 210 includes:

an acquisition submodule, configured to acquire the flag information carried in a $\bar{a}(A+7)$ bit of a PBCH message.

Figure 12:
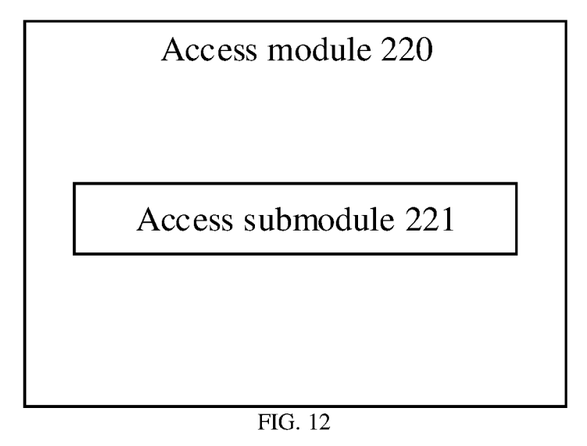
FIG. 12 is a block diagram of yet another initial access indication apparatus according to an example.

In an example, as shown in FIG. 12, the access module 220 includes:

an access submodule 221, configured to, when the flag information indicates that the initial access bandwidth corresponding to the SSB supports the access of the first type of UE, access the network by using the configuration information included in the SSB; and when the flag information indicates that the initial access bandwidth corresponding to the SSB does not support the access of the first type of UE, not access the network by using the configuration information included in the SSB.

In an example, the transmission module 110, the configuration module 120, the acquisition module 210, the access module 220, etc. may be implemented by one or more Central Processing Units (CPUs), Graphics Processing Units (GPUs), baseband processors (BPs), Application Specific Integrated Circuits (ASICs), DSPs, Programmable Logic Devices (PLDs), complex programmable logic device (CPLD, Complex Programmable Logic Devices (CPLDs), Field-Programmable Gate Arrays (FPGAs), general-purpose processors, controllers, Micro Controller Units (MCUs), microprocessors, or other electronic components, or may be implemented in combination with one or more radio frequency (RF) antennas to perform the foregoing method.

Figure 13:
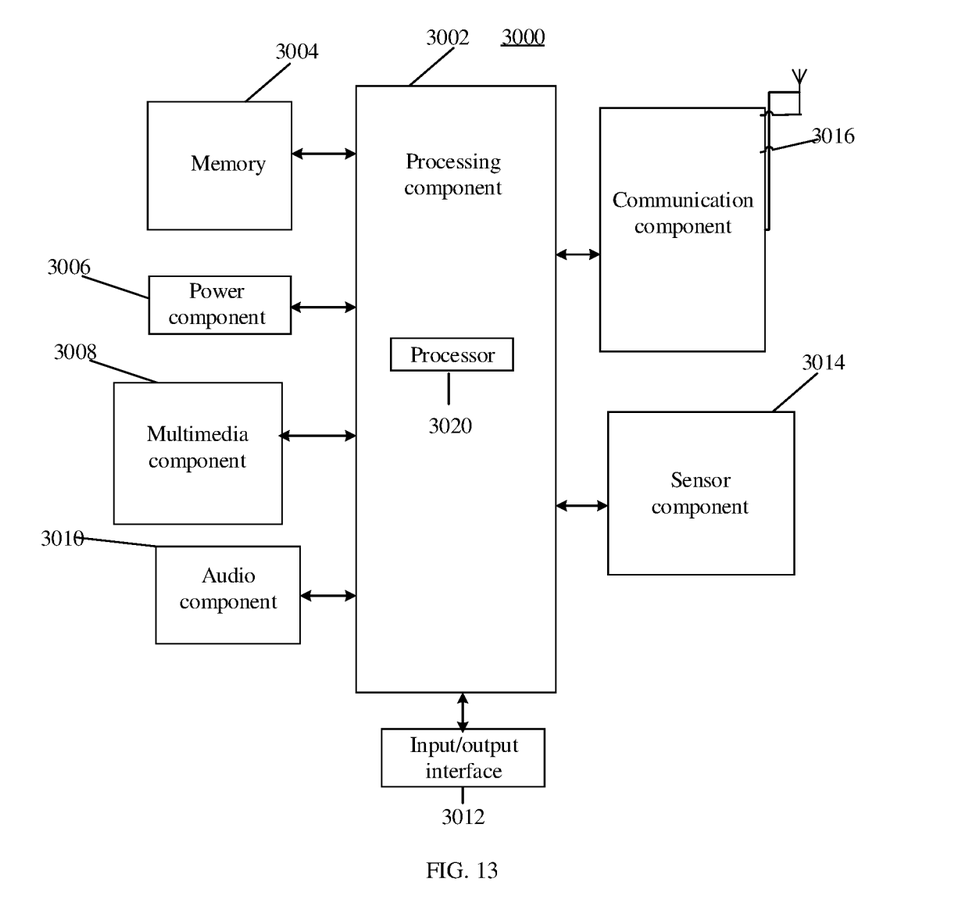
FIG. 13 is a block diagram of an apparatus for initial access indication according to an example.

FIG. 13 is a block diagram of an apparatus 3000 for initial access indication according to an example. For example, the apparatus 3000 may be a mobile phone, a computer, a digital broadcasting terminal, a messaging device, a game console, a tablet device, a medical device, a fitness device, a personal digital assistant, etc.

Referring to FIG. 13, the apparatus 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 usually controls the overall operations of the apparatus 3000, such as operations associated with display, telephone call, data communication, camera operation and recording operation. The processing component 3002 may include one or more processors 3020 to execute instructions to complete all of or part of the steps of the above method. Moreover, the processing component 3002 may include one or more modules to facilitate interaction between the processing component 3002 and other components. For example, the processing component 3002 may include a multimedia module to facilitate interaction between the multimedia component 3008 and the processing component 3002.

The memory 3004 is configured to store various types of data to support the operation of the apparatus 3000. Examples of these data include instructions for any application or method operated on the apparatus 3000, contact data, phone book data, messages, pictures, videos, etc. The memory 3004 may be implemented by any type of volatile or non-volatile storage device or a combination thus, such as a static random access memory (SRAM), an electrically erasable programmable read-only memory (EEPROM), an erasable. programmable read-only memory (EPROM), a programmable read-only memory (PROM), a read-only memory (ROM), a magnetic memory, a flash memory, a magnetic disk or an optical disk.

The power component 3006 supplies power to various components of the apparatus 3000. The power component 3006 may include a power management system, one or more power sources, and other components associated with power generation, management and distribution of the apparatus 3000.

The multimedia component 3008 includes a screen that provides an output interface between the apparatus 3000 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of a touch or slide, but also the duration and pressure associated with the touch or slide. In some examples, the multimedia component 3008 includes a front camera and/or a rear camera. When the apparatus 3000 is in an operation mode, such as a shooting mode or a video mode, the front camera and/or the rear camera can receive external multimedia data. Each front or rear camera may be a fixed optical lens system or have focal length and optical zoom capability.

The audio component 3010 is configured to output and/or input audio signals. For example, the audio component 3010 includes a microphone (MIC), which is configured to receive external audio signals when the apparatus 3000 is in an operational mode, such as a call mode, a recording mode and a voice recognition mode. The received audio signals may be further stored in the memory 3004 or sent by the communication component 3016. In some examples, the audio component 3010 further includes a speaker for outputting audio signals.

The I/O interface 3012 provides an interface between the processing component 3002 and a peripheral interface module. The peripheral interface module may be a keyboard, a click wheel, a button, etc. The button may include but is not limited to a home button, a volume button, a start button and a lock button.

The sensor component 3014 includes one or more sensors for providing various aspects of status assessment for the apparatus 3000. For example, the sensor component 3014 may detect an on/off state of the apparatus 3000, and relative positions of components such as a display and a keypad of the apparatus 3000. The sensor component 3014 may also detect a position change of the apparatus 3000 or one component of the apparatus 3000, presence or absence of contact between the user and the apparatus 3000, an orientation or acceleration/deceleration of the apparatus 3000 and a temperature change of the apparatus 3000. The sensor component 3014 may include a proximity sensor configured to detect the presence of nearby objects without any physical contact. The sensor component 3014 may also include an optical sensor, such as a CMOS or CCD image sensor, for use in imaging applications. In some examples, the sensor component 3014 may also include an acceleration sensor, a gyro sensor, a magnetic sensor, a pressure sensor, or a temperature sensor.

The communication component 3016 is configured to facilitate wired or wireless communication between the apparatus 3000 and other devices. The apparatus 3000 may access a wireless network based on communication standards, such as WiFi, 2G or 3G, or a combination thus. In one example, the communication component 3016 receives broadcast signals or broadcast associated information from an external broadcast management system via a broadcast channel. In an example, the communication component 3016 further includes a near field communication (NFC) module to facilitate short range communication. For example, the NFC module may be implemented based on radio frequency identification (RFID) technology, infrared data association (IrDA) technology, ultra wide band (UWB) technology, Bluetooth (BT) technology, and other technologies.

In an example, the apparatus 3000 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components to perform the above method.

In an example, a non-transitory computer-readable storage medium including instructions is further provided, such as a memory 3004 including instructions executable by the processor 3020 of the apparatus 3000 to complete the above method. For example, the non-transitory computer-readable storage medium may be an ROM, a random access memory (RAM), a CD-ROM, a magnetic tape, a floppy disk, an optical data storage device, etc.

After considering the specification and practicing the invention disclosed herein, those skilled in the art would readily conceive of other examples of the present invention. The present application is intended to cover any variations, uses or adaptive changes of the examples of the present disclosure. These variations, uses or adaptive changes follow the general principle of the examples of the present disclosure and include common general knowledge or conventional technical means in the technical field that are not disclosed in the examples of the present disclosure. The description and the examples are merely regarded as exemplary, and the real scope and spirit of the examples of the present invention are indicated by the following claims.

It should be understood that the examples of the present invention are not limited to the precise structure described above and shown in the drawings, and various modifications and changes may be made without departing from its scope. The scope of the examples of the present invention is limited only by the appended claims.

The invention claimed is:

1. An initial access method, comprising:
   carrying flag information in a Synchronization Signal Block (SSB), the flag information indicating whether an initial access bandwidth corresponding to the SSB supports access of a first type of user equipment (UE);
   wherein the initial access bandwidth comprises:
      a transmission bandwidth of resource configuration information of a control resource collection corresponding to the SSB;
   wherein the flag information indicating whether the initial access bandwidth corresponding to the SSB supports access of the first type of UE comprises:
      when the transmission bandwidth of the resource configuration information of the control resource collection is not greater than a bandwidth of the SSB, the flag information indicating that the initial access bandwidth corresponding to the SSB supports access of the first type of UE.

2. The initial access method according to claim 1, wherein carrying the flag information in the SSB comprises:

carrying the flag information in a $\bar{a}(A+7)$ bit of a Physical Broadcast Channel (PBCH) message, the $\bar{a}(A+7)$ bit representing a 7th bit of a payload in the PBCH.

3. The initial access method according to claim 1, further comprising:
configuring the control resource collection corresponding to the SSB;
wherein the transmission bandwidth of the resource configuration information of the control resource collection is determined according to a number of resources included in the control resource collection.

4. The initial access method according to claim 3, wherein the flag information indicating whether the initial access bandwidth corresponding to the SSB supports access of the first type of UE comprises:
when the transmission bandwidth of the resource configuration information of the control resource collection is greater than a bandwidth of the SSB, the flag information indicating that the initial access bandwidth corresponding to the SSB supports access of a second type of UE, wherein a bandwidth supported by the second type of UE is greater than that supported by the first type of UE.

5. An initial access method, comprising:
acquiring flag information carried in a SSB, the flag information indicating whether an initial access bandwidth corresponding to the SSB supports access of a first type of UE; and
determining, according to the flag information, whether to use configuration information included in the SSB to access a network;
wherein the initial access bandwidth comprises:
a transmission bandwidth of resource configuration information of a control resource collection corresponding to the SSB;
wherein the flag information indicating whether the initial access bandwidth corresponding to the SSB supports access of the first type of UE comprises:
when the transmission bandwidth of the resource configuration information of the control resource collection is not greater than a bandwidth of the SSB, the flag information indicating that the initial access bandwidth corresponding to the SSB supports access of the first type of UE.

6. The initial access method according to claim 5, wherein acquiring the flag information carried in the SSB comprises:
acquiring the flag information carried in a $\bar{a}(A+7)$ bit of a Physical Broadcast Channel (PBCH) message, the $\bar{a}(A+7)$ bit representing a 7th bit of a payload in the PBCH.

7. The initial access method according to claim 5, wherein determining, according to the flag information, whether to use configuration information included in the SSB to access the network comprises:
when the flag information indicates that the initial access bandwidth corresponding to the SSB supports the access of the first type of UE, using the configuration information included in the SSB to access the network; and
when the flag information indicates that the initial access bandwidth corresponding to the SSB does not support the access of the first type of UE, not using the configuration information included in the SSB to access the network.

8. An initial access indication apparatus, comprising: a transceiver, a memory, a processor, and a computer program stored in the memory and executed by the processor; wherein
the processor is connected with the transceiver and the memory respectively, and is configured to carry flag information in a Synchronization Signal Block (SSB), the flag information indicating whether an initial access bandwidth corresponding to the SSB supports access of a first type of user equipment (UE);
wherein the initial access bandwidth comprises:
a transmission bandwidth of resource configuration information of a control resource collection corresponding to the SSB;
wherein the flag information indicating whether an initial access bandwidth corresponding to the SSB supports the access of a first type of UE comprises:
when the transmission bandwidth of the resource configuration information of the control resource collection is not greater than the bandwidth of the SSB, the flag information indicating that the initial access bandwidth corresponding to the SSB supports access of the first type of UE.

9. The initial access indication apparatus according to claim 8, wherein the processor is further configured to:
carry the flag information in a $\bar{a}(A+7)$ bit of a Physical Broadcast Channel (PBCH) message, the $\bar{a}(A+7)$ bit representing a 7th bit of a payload in the PBCH.

10. The initial access indication apparatus according to claim 9, wherein the processor is further configured to:
configure the control resource collection corresponding to the SSB;
wherein the transmission bandwidth of the resource configuration information of the control resource collection is determined according to a number of resources included in the control resource collection.

11. The initial access indication apparatus according to claim 8, wherein the flag information indicating whether the initial access bandwidth corresponding to the SSB supports access of the first type of UE comprises:
when the transmission bandwidth of the resource configuration information of the control resource collection is greater than the bandwidth of the SSB, the flag information indicating that the initial access bandwidth corresponding to the SSB supports the access of a second type of UE, wherein the bandwidth supported by the second type of UE is greater than that supported by the first type of UE.

12. A non-transitory computer storage medium storing a computer program, wherein, after the computer program is executed by a processor, the processor performs the method according to claim 1.

13. An initial access indication apparatus, comprising: a transceiver, a memory, a processor, and a computer program stored in the memory and executed by the processor; wherein,
the processor is connected with the transceiver and the memory respectively, and is configured to implement the method according to claim 5 by executing the computer program.

14. An initial access indication apparatus, comprising: a transceiver, a memory, a processor, and a computer program stored in the memory and executed by the processor; wherein, the processor is connected with the transceiver and the memory respectively, and is configured to implement the method according to claim 1 by executing the computer program.

15. A non-transitory computer storage medium storing a computer program, wherein, after the computer program is executed by a processor, the processor performs the initial access method according to claim 5.

\* \* \* \* \*